Feb. 20, 1923.

W. H. HURT.
MECHANISM FOR PREPARING FOOD PRODUCTS.
FILED SEPT. 20, 1922.

Witness:
Geo. L. Chapel

Inventor:
Walter H. Hurt
by Cyrus W. Rice
Attorney.

Feb. 20, 1923.
W. H. HURT.
MECHANISM FOR PREPARING FOOD PRODUCTS.
FILED SEPT. 20, 1922.
1,446,091.
5 SHEETS—SHEET 3.
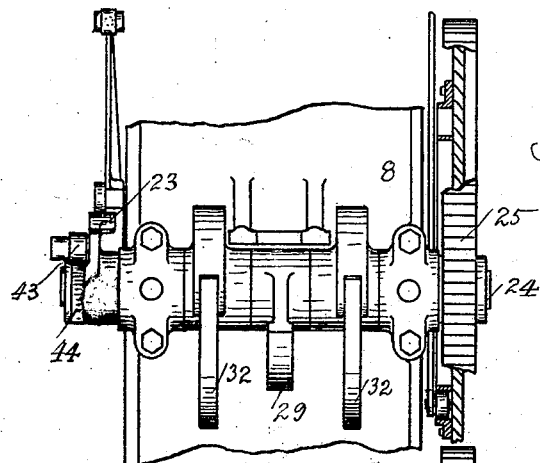
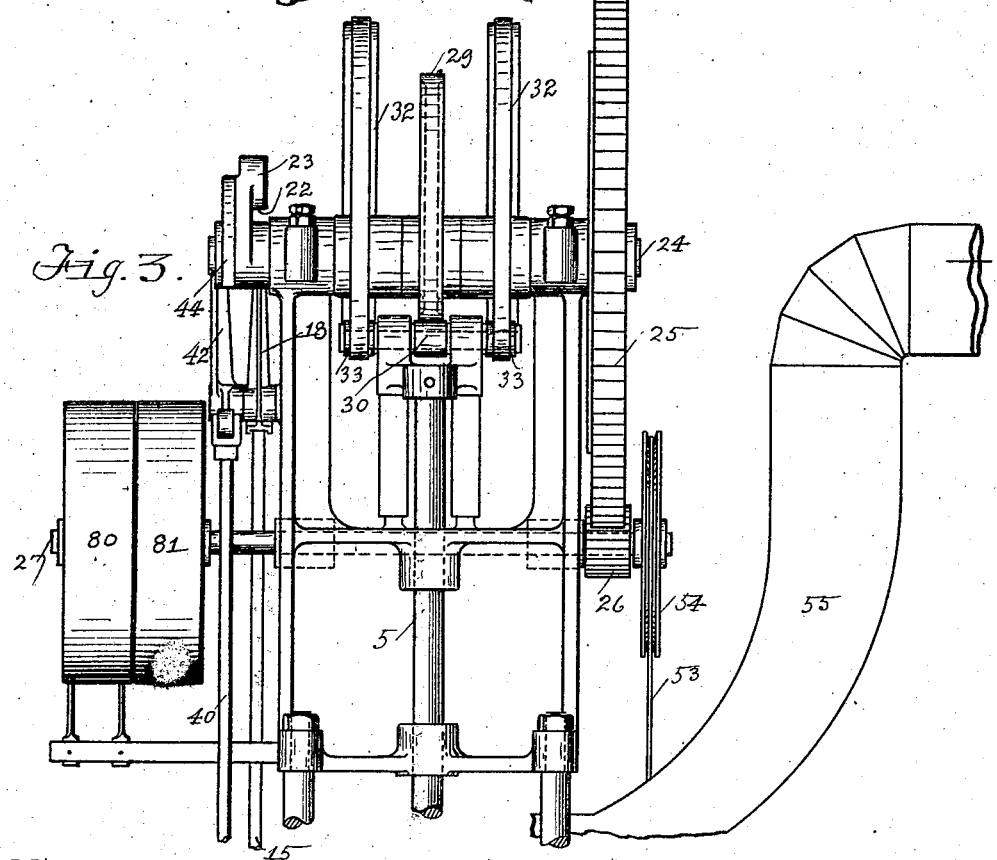
Witness:
Geo. L. Chapel
Inventor:
Walter H. Hurt
by Cyrus W. Rice
Attorney.

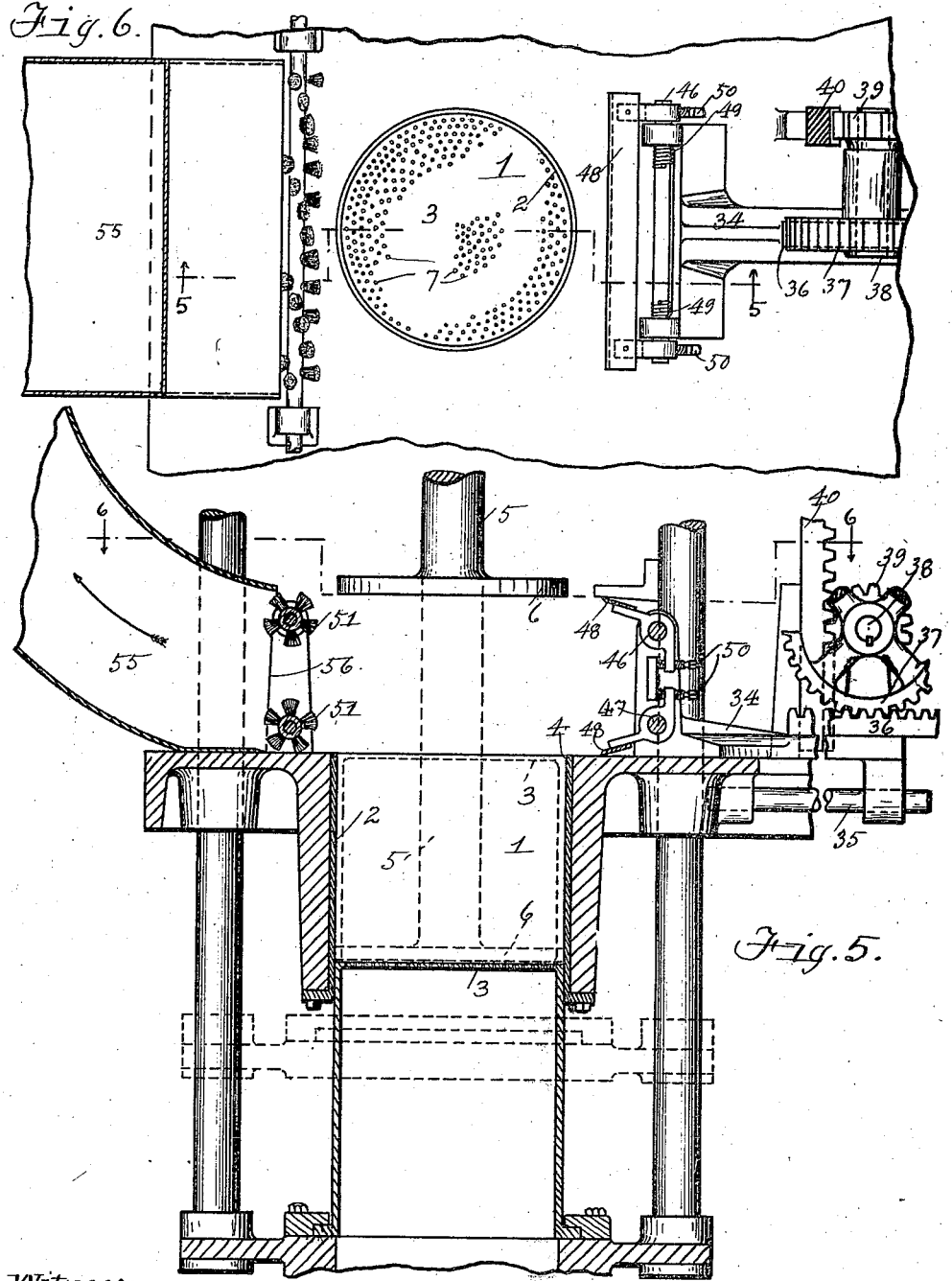

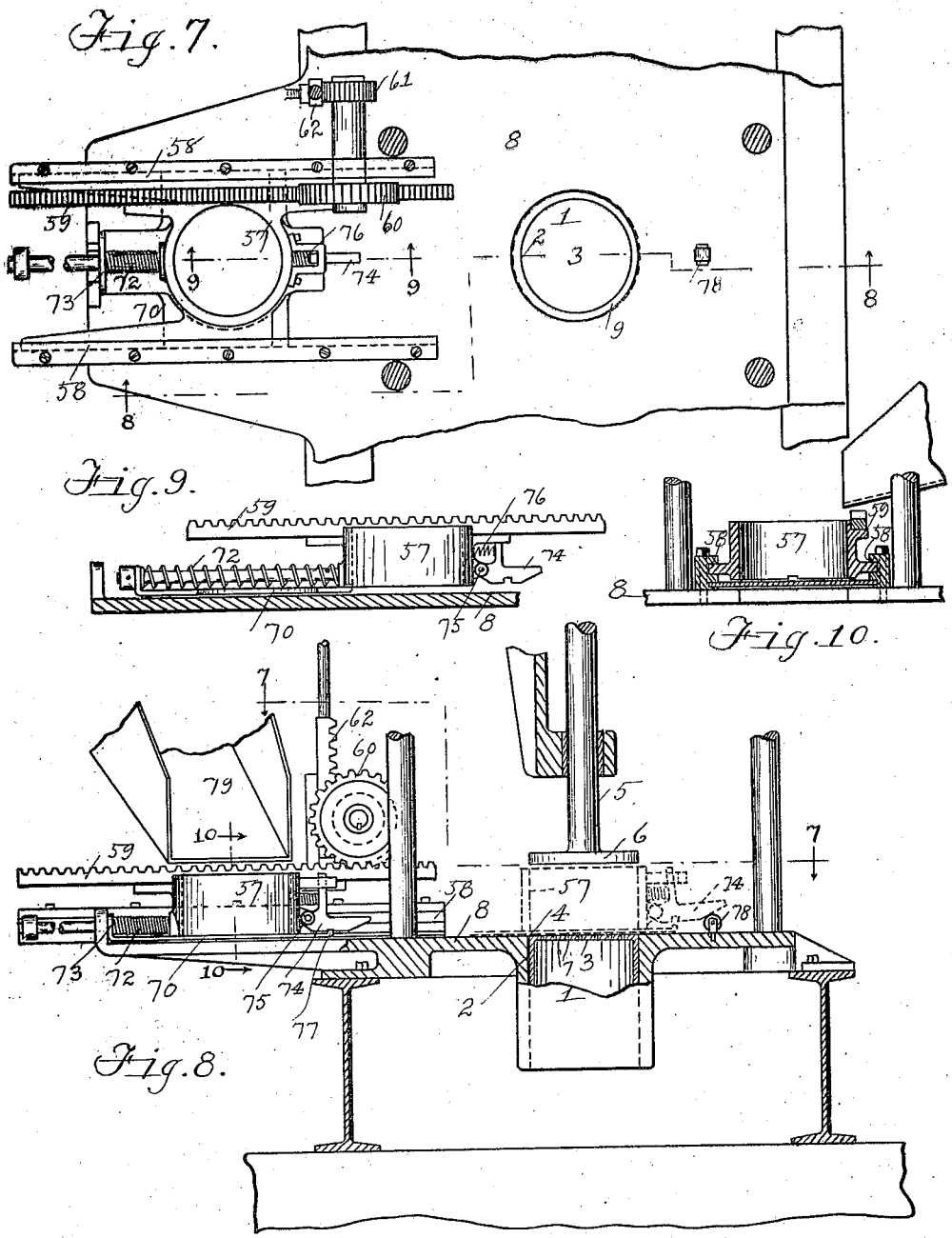

Patented Feb. 20, 1923.

1,446,091

UNITED STATES PATENT OFFICE.

WALTER H. HURT, OF PLAINFIELD TOWNSHIP, KENT COUNTY, MICHIGAN.

MECHANISM FOR PREPARING FOOD PRODUCTS.

Application filed September 20, 1922. Serial No. 589,383.

*To all whom it may concern:*

Be it known that I, WALTER H. HURT, a citizen of the United States, residing at Plainfield Township, in the county of Kent and State of Michigan, have invented new and useful Improvements in Mechanisms for Preparing Food Products, of which the following is a specification.

The present invention relates to mechanisms for preparing food products; and its object is, generally, to provide an improved mechanism whereby vegetables or fruits may be crushed and reduced to small portions and whereby their skins, seeds and the like may be separated from their edible parts; and further, to provide improved means for cleaning certain parts of such mechanism which contact with the vegetables or fruits; and further, to provide improved feeding means for such mechanisms.

These and any other objects hereinafter appearing are attained by, and the invention finds preferable embodiment in the structure hereinafter particularly described in the body of this specification and illustrated by the accompanying drawings, in which:—

Figure 3 is a rear view of the upper part of the same;

Figure 4 is a top plan view of the upper parts thereof;

Figure 5 is a sectional view (enlarged) of certain parts seen in the lower portion of Figure 1, taken on vertical planes corresponding to line 5—5 of Figure 6;

Figure 6 is a plan view of parts seen in Figure 5, certain parts being sectioned on horizontal planes corresponding to line 6—6 of Figure 5;

Figure 7 is a top plan view of a portion of the table of the mechanism and the feeding means, certain parts being sectioned on horizontal planes corresponding to line of Figure 8;

Figure 8 is a side view of the same, certain parts being sectioned on vertical planes corresponding to line 8—8 of Figure 7;

Figure 9 is a side view of a portion of the feeding means, showing the same in another position, the table being sectioned on line 9—9 of Figure 7; and Figure 10 is a sectional view of a portion of the feeding means taken on a vertical plane corresponding to line 10—10 of Figure 8.

Figure 1:
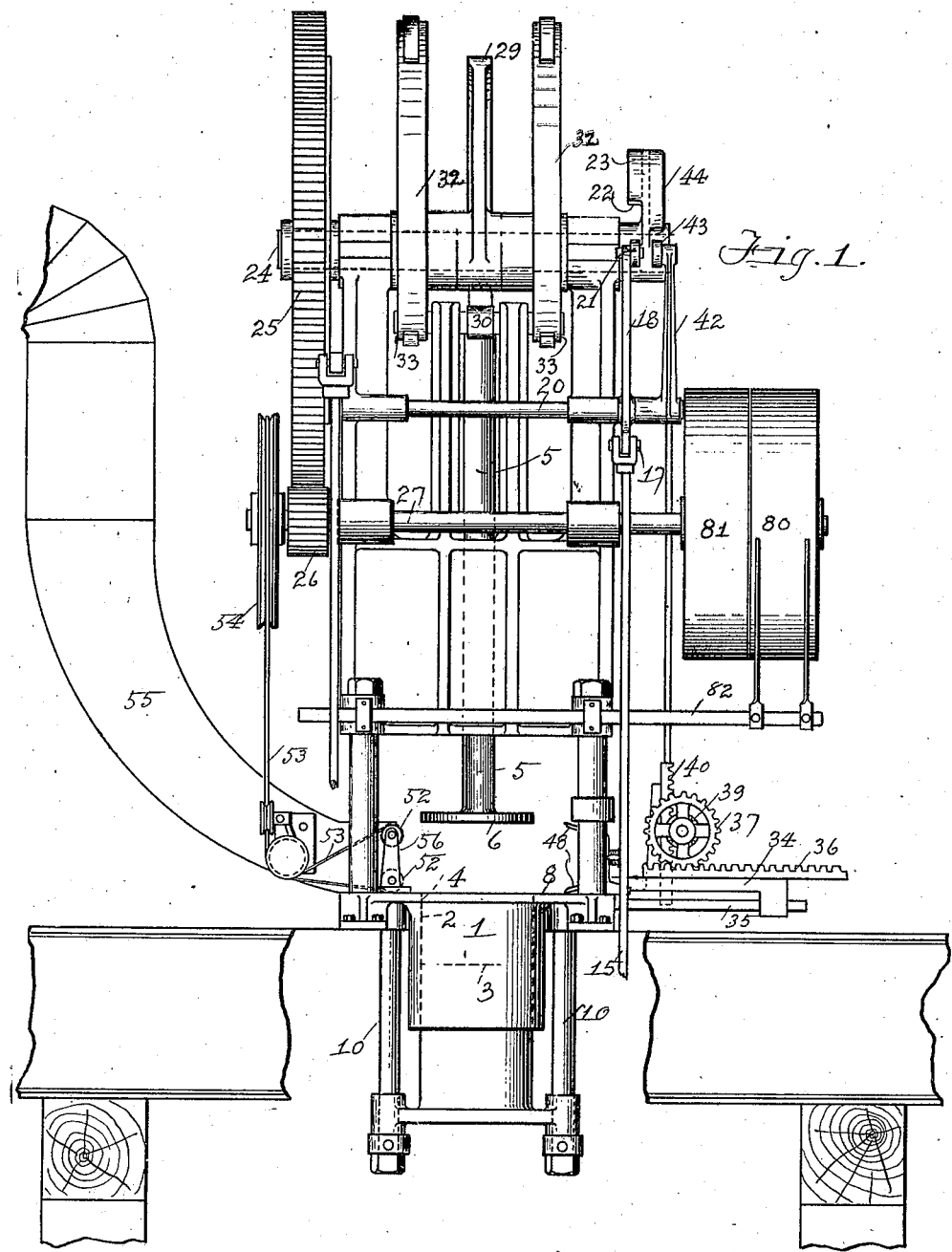
Figure 1 is a front view of mechanism for preparing food products, certain parts being broken away or omitted for the sake of clearness.
Figure 2:
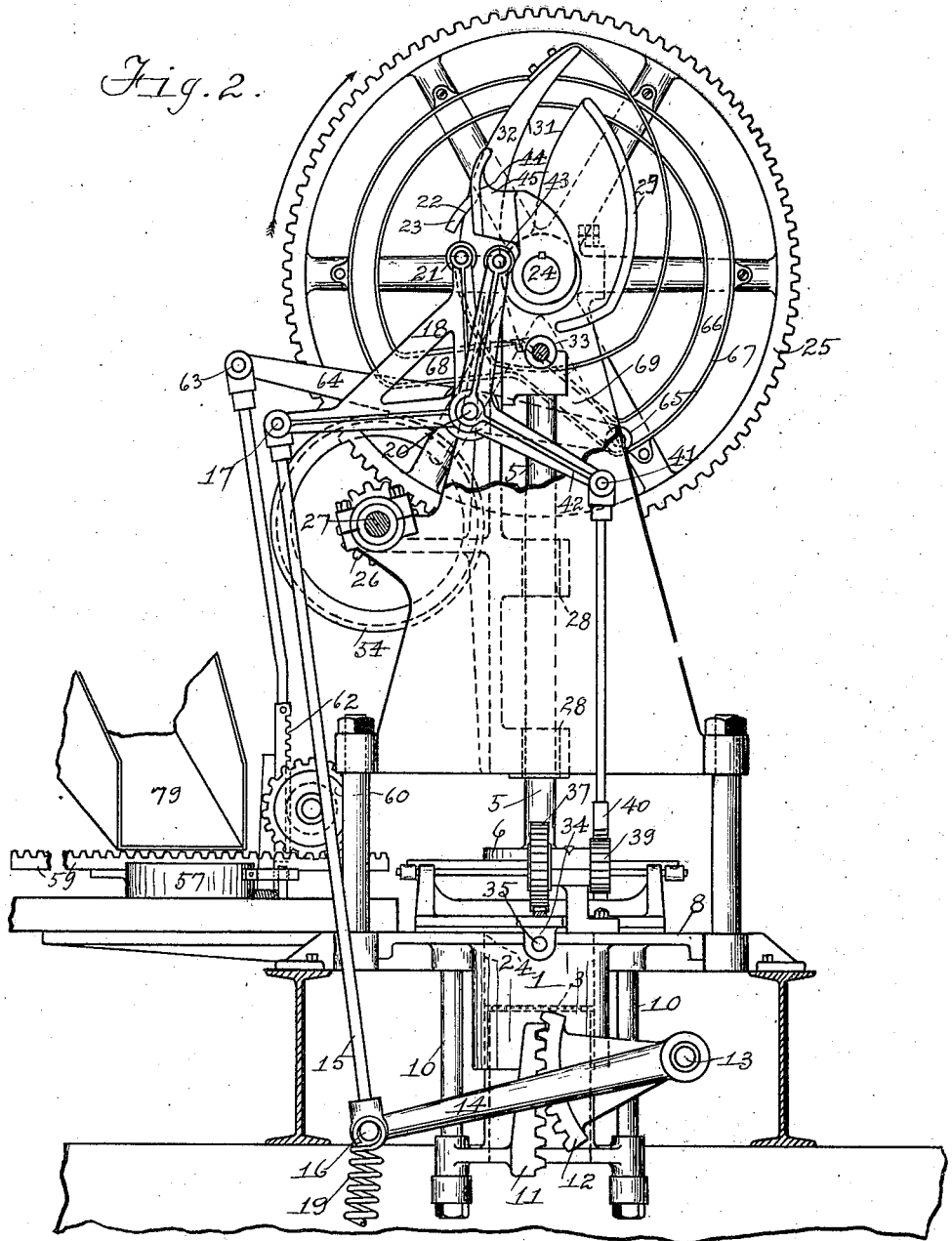
Figure 2 is a right-hand side view of the same, the driving pulley being omitted and its shaft sectioned transversely.

In the embodiment of this invention chosen for illustration by the drawings and for detailed description in the body of this specification, the main features are: a container, designated generally 1, which comprises side walls 2 and a bottom wall 3 moving like a piston in the container between a position (seen in Figure 8) adjacent the mouth 4 of the container and a position (seen in Figures 2 and 5) inwardly therefrom; and a plunger 5 carrying the other end wall 6 of the container which wall moves like a piston from a position (seen in Figures 1, 5 and 8) outside the container to a position (seen in dotted lines in Figure 5) inside the container, at least one of these walls, preferably the bottom wall 3, being foraminous, through whose small openings 7 the vegetables, as boiled potatoes or cooked fruits (in their skins) placed in the container, may be forced by the downward crushing movement of the plunger, the skins however remaining in the container. Other important, though subsidiary features are: means operable to scrape from the faces of the end walls while in their upper positions the skins of the vegetables or fruits; cleaning means for such scrapers; and feeding means operating while the upper end wall is at its upper position and subsequently to the operation of said scraping means;—all which will be more fully described hereinafter.

The constructional forms of these several parts and the means whereby they are operated may be very various; preferably however, such constructions and means are such as appear in the drawings, and are particularly described and explained as follows:

The structure illustrated has a horizontally disposed table portion 8 with an opening therethrough forming the mouth or inlet 4 of the container 1 whose side walls 2 are preferably circular in cross section as shown and which may be furnished with a lining 9 removable for cleaning purposes. The bottom wall 3 of the container is slidably carried or reciprocated, on vertical guides 10, between its lowest position near the lower end of the side walls 2 and its uppermost position (level with the surface of the table), thus sliding freely along but closely fitting the inner surface of the side walls in such movements, by its rack 11 with which meshes the toothed segment 12 rockable on its pivotal mounting 13 by its arm 14 to whose free end the link 15 is pivoted at 16, the upper end of this link being pivoted at 17 on an arm of the bell-crank lever 18 fulcrumed on the spindle 20 carried by the frame of the mechanism, the other arm of said lever being swung to raise the bottom wall 3 by its roll 21 engaging the inner surface 22 of the cam 23 keyed on the shaft 24 carrying the gear 25 meshing with the gear 26 on the driving shaft 27. The bottom wall 3 is urged to its lower position by the spring 19. While in this lower position, the vegetables or fruits are placed in the container, whereupon the plunger 5, slidable vertically in guides 28, is forced downwardly from its upper position (seen in Figure 1) by the cam 29 on the shaft 24 and operating on the roll 30 on the plunger's upper end. This movement of the plunger carries the upper wall 6 into the container along its side walls, slidably but closely fitting the side walls, thus crushing the vegetables or fruits in the container and forcing the same in small portions through the openings 7 in the foraminous bottom wall, the skins thereof however remaining in the container to be expelled therefrom by the next upward movement of the bottom wall 3. The plunger 5 is drawn upwardly by the inner surfaces 31 of the cams 32 operating on the rolls 33 on the plunger's upper end. While the end walls 3 and 6 of the container are at their upper positions, they dwell therein while the scraping means operate to scrape from the adjacent faces of said walls the skins which have adhered thereto or have been expelled from the container by the upward movement of its bottom wall. This scraping means comprises a reciprocating member 34, horizontally slid on a guiding rod 35, by its rack 36 meshing with the gear 37 on whose shaft 38 is carried the gear 39 meshing with a rack 40 whose upper end is pivoted at 41 on an arm of the bell-crank lever 42 whose other arm's roll 43 is swung one way or the other to effect the scraping means' reciprocation by the cam 44 on the shaft 24 and having the cam groove 45 in which travels the roll 43 of said arm. This member 34 has pivotally mounted, at 46, 47 respectively thereon, scraping elements furnished with scraping blades 48. These scraping blades are spring pressed at 49 to scrapingly contact the faces of the end walls 3 and 6 respectively, by the inward movement of the reciprocating member 34, during the dwell of these end walls at their upmost position. Adjusting screws 50 limit the movement of these blades toward said end walls respectively. When the scraping blades have reached the end of their scraping movement and before they are retracted by the reverse movement of the member 34, they are cleaned by the cleaning means, comprising the brush rolls 51, oppositely rotated by their pulleys 52 carrying a belt 53 passing over the driving pulley 54 on the driving shaft 27. An air-pipe 55 whose mouth 56 is adjacent these brush rolls, and which is furnished with a suitable fan (not shown), draws thereinto the skins and the like expelled from the container and removed from the scraping blades.

Means for feeding predetermined amounts of the vegetables or fruits to the container are also desirably provided. As shown, such means comprises a shell 57 open at its upper and lower ends and circular in cross-section so as to correspond and register cross-sectionally with the container. This shell is movable horizontally along the surface of the table 8 into and out of registration with the mouth of the container, being slid in the guides 58 to effect such movements by its rack 59 meshing with the gear 60, the gear 61 on whose shaft meshes with the rack 62 whose upper end is pivoted at 63 to the lever 64 whose other arm carries a roll 65 traveling in the groove 66 of the cam 67 on the gear 25. The operative portions 68, 69 of this cam groove slide the shell 57 inwardly into registration with the container (so that the contents of the shell may fall thereinto) and then retract the shell to the position seen in Figures 7 and 8—all during the dwell of the end wall 6 in its uppermost position and subsequently to the scraping and retracting movements of the scraping means. A closure 70 to close the bottom of the shell and to open the same when in registration with the container is mounted slidably relatively to the shell. As the shell is being retracted toward its position seen in Figures 7 and 8, the spring 72 between the shell and the upturned outer end 73 of the closure is compressed until it is held in compression by the catch 74 pivotally mounted at 75 on the shell and spring-pressed at 76 into holding engagement with the keeper 77 on the closure. When the shell has been moved oppositely and into registration with the mouth of the container, this catch is tripped by striking the roll 78 on the table; whereupon, the spring 72 at once expands and suddenly moves the closure outwardly, thus opening the shell and permitting its contents to fall at once into the container. A spout 79 may be provided to deliver the vegetables or fruits to the feeding means. Driving belt pulleys 80, 81 and belt shifting means 82 are shown.

For some uses, the container—that is, its side walls—may be dispensed with, the table portion 8 extending horizontally without any opening 4 therein and either the table or the end 6 of the plunger (or both) being foraminous, the descent of the plunger in such case operating to crush the vegetables or fruits on the table and to cause the same in small portions to pass through the foraminous part, the skins and the like remaining between the table and the face of the plunger and being cleared away by the scraping means.

The invention being intended to be pointed out in the claims, is not to be limited to or by details of construction of the particular embodiment thereof illustrated by the drawings or hereinbefore shown or described.

I claim:—

1. In mechanism of the character described; a container comprising side walls and a bottom wall having a piston-like movement therein between a position adjacent the mouth of the container and a position inwardly therefrom; a plunger carrying the other end wall of the container having a piston-like movement between a position outside the container and a position inside it, at least one of said walls being foraminous.

2. In mechanism of the character described; a container comprising side walls and a bottom wall having a piston-like movement therein between a dwell adjacent the mouth of the container and a position inwardly therefrom; a plunger carrying the other end wall of the container having a piston-like movement between a dwell outside the container and a position inside it, at least one of said walls being foraminous; scraping means adapted to scrape the face of at least one of the end walls, and operating during its dwell.

3. In mechanism of the character described; a container comprising side walls and a bottom wall having a piston-like movement therein between a dwell adjacent the mouth of the container and a position inwardly therefrom; a plunger carrying the other end wall of the container having a piston-like movement between a dwell outside the container and a position inside it, at least one of said walls being foraminous; scraping means adapted to scrape the faces of both of the end walls, and operating during their dwells.

4. In mechanism of the character described; a container comprising side walls and a bottom wall having a dwell adjacent the mouth of the container and a position inwardly therefrom; a plunger carrying the other end wall of the container having a piston-like movement between a dwell outside the container and a position inside it, at least one of said walls being foraminous; scraping means movable transversely to the longitudinal direction of the container and adapted to scrape the faces of both of the end walls and operating during their dwells.

5. In mechanism of the character described; a container comprising side walls and a bottom wall having a piston-like movement therein between a dwell adjacent the mouth of the container and a position inwardly therefrom; a plunger carrying the other end wall of the container having a piston-like movement between a dwell outside the container and a position inside it, at least one of said walls being foraminous; scraping means movable transversely to the longitudinal direction of the container and adapted to scrape the faces of both of the end walls and operating during their dwells; cleaning means adapted to clean the scraping means, and operating subsequently to the operation of the scraping means.

6. In mechanism of the character described; a container comprising side walls and a bottom wall having a piston-like movement therein between a dwell adjacent the mouth of the container and a position inwardly therefrom; a plunger carrying the other end wall of the container having a piston-like movement between a dwell outside the container and a position inside it, at least one of said walls being foraminous; scraping means movable transversely to the longitudinal direction of the container and adapted to scrape the faces of both of the end walls and operating during their dwells; cleaning means adapted to clean the scraping means, and operating subsequently to the operation of the scraping means; an air pipe having a mouth adjacent the cleaning means; means for drawing air into the mouth of the pipe and through the pipe.

7. In mechanism of the character described; a container comprising side walls and a bottom wall having a piston-like movement therein between a dwell adjacent the mouth of the container and a position inwardly therefrom; a plunger carrying the other end wall of the container having a piston-like movement between a dwell outside the container and a position inside it, at least one of said walls being foraminous; scraping means operating during the dwells of the end walls, and adapted to scrape the face of at least one of the end walls, and comprising a member having a reciprocating movement parallel to said face and carrying a pivotally mounted scraping blade spring-pressed against said face.

8. In mechanism of the character described; a container comprising side walls and a bottom wall having a piston-like movement therein between a position adjacent the mouth of the container and a position inwardly therefrom; a plunger carrying the other end wall of the container having a piston-like movement between a position outside the container and a position inside it, at least one of said walls being foraminous; feeding means comprising a hollow shell open at its upper and lower ends and having a closure for its lower end and being movable into and out of registration with the mouth of the container while the second-mentioned end wall is outside the container.

9. In mechanism of the character described; a horizontally disposed table; a container comprising side walls extending downwardly from an opening in the table and comprising also a bottom wall having a piston-like movement therein between a position adjacent the surface of the table and a position below it; a plunger carrying the other end wall of the container and having a piston-like movement between a position above the table and a position inside the container, at least one of said walls being foraminous; feeding means comprising a hollow shell open at its upper and lower ends and movable along the surface of the table into and out of registration with said opening while the second-mentioned end wall is outside the container.

10. In mechanism of the character described; a container comprising side walls and a bottom wall having a piston-like movement therein between a dwell adjacent the mouth of the container and a position inwardly therefrom; a plunger carrying the other end wall of the container having a piston-like movement between a dwell outside the container and a position inside it, at least one of said walls being foraminous; scraping means operating during dwells of the end walls and adapted to scrape the faces of both of the end walls and comprising a member having a reciprocating movement parallel to said surfaces and carrying pivotally mounted scraping blades spring-pressed against said faces respectively; feeding means comprising a hollow shell open at its upper and lower ends and movable during the dwell of the second end wall and subsequently to the operation of the scraping means into and out of registration with the mouth of the container.

11. In mechanism of the character described; a horizontally disposed table member; a plunger member movable toward and away from the table member and having a face parallel with the table member, at least one of said members being foraminous; scraping means operating while the plunger member is remote from the table member and adapted to scrape that surface of at least one of said members which is adjacent the other member.

12. In mechanism of the character described; a horizontally disposed table member; a plunger member movable toward and away from the table member and having a face parallel with the table member, at least one of said members being foraminous; scraping means operating while the plunger member is remote from the table member and adapted to scrape that surface of at least one of said members which is adjacent the other member; feeding means comprising a hollow shell open at its upper and lower ends and movable while the plunger member is remote from the table member and subsequently to the operation of the scraping means into and out of a position between the table member and the face of the plunger member.

13. In mechanism of the character described; a horizontally disposed table member; a plunger member movable toward and away from the table member and having a face parallel with the table member, at least one of said members being foraminous; feeding means comprising a hollow shell open at its upper and lower ends and movable while the plunger member is remote from the table member into and out of a position between the table member and the face of the plunger member.

In testimony whereof I have hereunto set my hand at Grand Rapids, Michigan, this 15th day of September, 1922.

WALTER H. HURT.